United States Patent
Eshet et al.

(10) Patent No.: US 11,796,666 B2
(45) Date of Patent: Oct. 24, 2023

(54) ANTENNA SELECTION IN A RADAR SYSTEM BASED ON MULTIPLE DETECTED OBJECTS AND MULTI-STEP PLANNING

(71) Applicant: GM Global Technology Operations LLC, Detroit, MI (US)

(72) Inventors: Yaron Eshet, Haifa (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 346 days.

(21) Appl. No.: 17/153,248

(22) Filed: Jan. 20, 2021

(65) Prior Publication Data
US 2022/0229169 A1   Jul. 21, 2022

(51) Int. Cl.
| | |
|---|---|
| G01S 13/72 | (2006.01) |
| G01S 7/03 | (2006.01) |
| G01S 13/931 | (2020.01) |
| G01S 13/02 | (2006.01) |

(52) U.S. Cl.
CPC ............. G01S 13/726 (2013.01); G01S 7/03 (2013.01); G01S 13/931 (2013.01); G01S 2013/0254 (2013.01)

(58) Field of Classification Search
CPC ........ G01S 13/726; G01S 7/03; G01S 13/931; G01S 13/42; G01S 13/90; G01S 7/282; G01S 7/285
See application file for complete search history.

(56) References Cited

U.S. PATENT DOCUMENTS

| | | | |
|---|---|---|---|
| 2004/0125012 A1* | 7/2004 | Okamura | G01S 13/04 342/28 |
| 2019/0214722 A1* | 7/2019 | Di Paola | H01Q 19/30 |
| 2020/0333431 A1* | 10/2020 | Völkel | G01S 13/426 |
| 2021/0396833 A1* | 12/2021 | Lehtimaki | H04W 4/80 |
| 2022/0231414 A1* | 7/2022 | Tsai | H01Q 1/243 |

OTHER PUBLICATIONS

Tabrikian et al., "Cognitive Antenna Selection for DOA Estimation in Automotive Radar", 2016 IEEE Radar Conference, pp. 1-5.

* cited by examiner

*Primary Examiner* — Donald H B Braswell
(74) *Attorney, Agent, or Firm* — CANTOR COLBURN LLP

(57) ABSTRACT

A radar system includes antenna elements and receive channels. An adaptive switch couples the receive channels to a subset of the antenna elements as selected antenna elements. The selected antenna elements receive reflected signals from reflection by objects and each of the receive channels outputs the digital signal based on the reflected signal from the coupled selected antenna element. A controller processes the digital signal from each receive channel to estimate a direction of arrival (DOA) to each object and generate candidate configurations of the switch. Assessing the candidate configurations includes performing a multi-step assessment using a decision tree with each candidate configuration as a root and examining accuracy of an output at a last step in the decision tree to select a selected candidate configuration based on the accuracy. The switch is configured according to the selected candidate configuration prior to receiving the reflected signals for a next iteration.

20 Claims, 3 Drawing Sheets

ANTENNA SELECTION IN A RADAR SYSTEM BASED ON MULTIPLE DETECTED OBJECTS AND MULTI-STEP PLANNING

The subject disclosure relates to antenna selection in a radar system based on multiple detected objects and multi-step planning.

Vehicles (e.g., automobiles, trucks, construction equipment, farm equipment, automated factory equipment) increasingly include sensors to obtain information about the vehicle and its surroundings. The information facilitates semi-autonomous and autonomous operation of the vehicle, for example. Exemplary sensors include cameras, light detection and ranging (lidar) systems, and radio detection and ranging (radar) systems. A multi-input multi-output (MIMO) radar system has multiple transmit antenna elements and multiple receive antenna elements. The number of transmit and receive channels may be fewer than the number of transmit and receive antenna elements. Accordingly, it is desirable to provide antenna selection in a radar system based on multiple detected objects and multi-step planning.

SUMMARY

In one exemplary embodiment, a method includes configuring an adaptive switch to couple a plurality of receive channels to a subset of a plurality of antenna elements as selected antenna elements and receiving reflected signals with the selected antenna elements. The method also includes processing each of the reflected signals received at each of the selected antenna elements at a corresponding one of the plurality of receive channels to obtain a digital signal at each of the plurality of receive channels, and processing the digital signal from each of the plurality of receive channels to estimate a direction of arrival (DOA) to each object that is detected based on the reflected signals. A set of candidate configurations of the adaptive switch is generated to be assessed based on the DOA to each object. Assessing the set of candidate configurations of the adaptive switch includes performing a multi-step assessment using a decision tree with each of the set of candidate configurations as a root and examining accuracy of an output at a last step in the decision tree. A selected candidate configuration is selected from the set of candidate configurations of the adaptive switch based on the accuracy obtained with each of the set of candidate configurations as the root of the decision tree. The adaptive switch is configured according to the selected candidate configuration among the set of candidate configurations of the adaptive switch prior to receiving the reflected signals for a next iteration.

In addition to one or more of the features described herein, the processing each of the reflected signals includes amplifying, mixing, and performing analog-to-digital conversion on each of the reflected signals.

In addition to one or more of the features described herein, estimating the DOA to each object includes performing an iterative process to detect two or more objects.

In addition to one or more of the features described herein, the performing the iterative process includes detecting and removing an object among the two or more objects that results in a strongest reflection then removing the object prior to the next iteration.

In addition to one or more of the features described herein, the method also includes generating the set of candidate configurations from a set of initial configurations. The assessing the set of initial configurations of the adaptive switch to obtain the candidate configurations is based on the DOA to each object includes determining a Bobrovski-Zakai bound (BZB) to each object.

In addition to one or more of the features described herein, the determining the BZB to each object is based on implementing a Metropolis-Hastings (MH) algorithm to simulate each object.

In addition to one or more of the features described herein, the method also includes fixing all but one of the plurality of receive channels coupled to all but one of the subset of the plurality of antenna elements to leave one unfixed receive channel and generating the set of initial configurations by coupling, in turn, the one unfixed receive channel to each of the plurality of antenna elements that is not coupled to all but one of the plurality of receive channels.

In addition to one or more of the features described herein, assessing the candidate configurations by performing the multi-step assessment using the decision tree includes using each of the candidate configurations as a root of the decision tree to grow sub-trees at each step of the multi-step assessment.

In addition to one or more of the features described herein, the using the decision tree includes growing each sub-tree based on random switching.

In addition to one or more of the features described herein, the selecting the selected candidate configuration is based on aggregating error statistics and calculating root mean square error (RMSE) at a last step of the multi-step assessment to select a corresponding root as the selected candidate configuration.

In another exemplary embodiment, a radar system includes a plurality of antenna elements and a plurality of receive channels. Each receive channel includes an analog-to-digital converter (ADC) to output a digital signal. The radar system includes an adaptive switch to couple the plurality of receive channels to a subset of the plurality of antenna elements as selected antenna elements. The selected antenna elements receive reflected signals that result from reflection by a plurality of objects of transmitted signals emitted by the radar system and each of the plurality of receive channels outputs the digital signal based on the reflected signal from the selected antenna element coupled thereto. A controller processes the digital signal from each of the plurality of receive channels to estimate a direction of arrival (DOA) to each object that is detected based on the reflected signals and generates a set of candidate configurations of the adaptive switch to be assessed based on the DOA to each object. Assessing the set of candidate configurations of the adaptive switch includes performing a multi-step assessment using a decision tree with each of the set of candidate configurations as a root and examining accuracy of an output at a last step in the decision tree. The controller also selects a selected candidate configuration from the set of candidate configurations of the adaptive switch based on the accuracy obtained with each of the set of candidate configurations as the root of the decision tree and configures the adaptive switch according to the selected candidate configuration among the set of candidate configurations of the adaptive switch prior to receiving the reflected signals for a next iteration.

In addition to one or more of the features described herein, each of the plurality of receive channels also includes an amplifier and a mixer.

In addition to one or more of the features described herein, the controller estimates the DOA to each object based on performing an iterative process to detect two or more objects.

In addition to one or more of the features described herein, the iterative process includes detecting and removing an object among the two or more objects that results in a strongest reflection then removing the object prior to the next iteration.

In addition to one or more of the features described herein, the controller generates the set of candidate configurations from a set of initial configurations and assesses the set of initial configurations of the adaptive switch to obtain the set of candidate configurations based on the DOA to each object by determining a Bobrovski-Zakai bound (BZB) to each object.

In addition to one or more of the features described herein, the controller determines the BZB to each object based on implementing a Metropolis-Hastings (MET) algorithm to simulate each object.

In addition to one or more of the features described herein, the controller fixes all but one of the plurality of receive channels coupled to all but one of the subset of the plurality of antenna elements to leave one unfixed receive channel and to generate the set of initial configurations by coupling, in turn, the one unfixed receive channel to each of the plurality of antenna elements that is not coupled to all but one of the plurality of receive channels.

In addition to one or more of the features described herein, the controller assesses the set of candidate configurations by performing the multi-step assessment using the decision tree by using each of the set of candidate configurations as a root of the decision tree to grow sub-trees at each step of the multi-step assessment.

In addition to one or more of the features described herein, the controller uses the decision tree by growing each sub-tree based on random switching.

In addition to one or more of the features described herein, the controller selects the selected candidate configuration based on aggregating error statistics and calculating root mean square error (RMSE) at a last step of the multi-step assessment to select a corresponding root as the selected candidate configuration.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
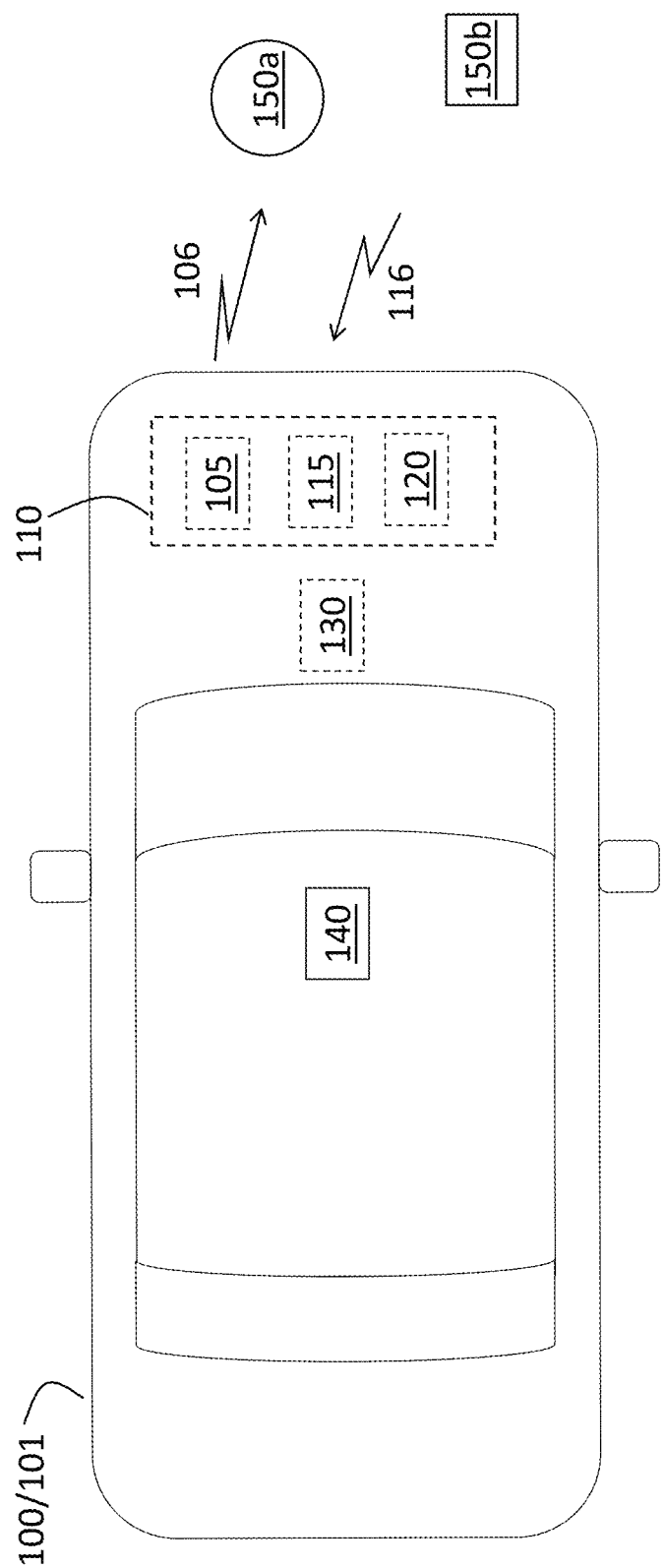
FIG. 1 is a block diagram of a vehicle that employs antenna selection in a radar system based on multiple detected objects and multi-step planning according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a number of types of sensors may be used in a vehicle. Certain applications call for a higher degree of angular resolution than others. Angular resolution refers to the accuracy of the angle to an object from some point of the vehicle (i.e., the direction of arrival (DOA)). An autonomous driving application, for example, requires higher angular resolution than other applications, because information obtained by the sensors regarding objects around the autonomous vehicle is critical in performing correct operation of the autonomous vehicle. The density of data provided by a lidar system facilitates the requisite angular resolution. However, lidar systems are more expensive and can be cost-prohibitive in consumer applications as compared with radar systems, for example. A suite of several (e.g., three to seven) radar systems may also achieve the requisite angular resolution but can also prove cost prohibitive.

Embodiments of the systems and methods detailed herein relate to antenna selection in a radar system based on multiple detected objects and multi-step planning. A radar system with a large aperture array (i.e., a large number of antenna elements) is desirable for a high-resolution imaging radar, but the transmit and receive channels that obtain and initially process the signals received by the antenna elements can be cost-prohibitive. Thus, as detailed, the number of transmit and receive channels is fewer than the full set of antenna elements, and a switching scheme is used to couple a set of transmit and receive channels to a subset of the available antenna elements. The switching, according to one or more embodiments, is based on multi-step planning and also considers a scenario in which multiple objects are detected. The multi-step planning means that a decision tree is used to consider the accuracy in DOA obtained with each switching scenario after more than one transmit and receive cycle. Thus, a given switching scenario selected for the next step (i.e., next transmit and receive cycle) is based on accuracy resulting after multiple steps of the decision tree.

In accordance with an exemplary embodiment, FIG. 1 is a block diagram of a vehicle 100 that employs antenna selection in a radar system 110 based on multiple detected objects 150a, 150b (generally referred to as 150) and multi-step planning. The exemplary vehicle 100 shown in FIG. 1 is an automobile 101. The vehicle 100 includes a radar system 110 with a transmit portion 105, a receive portion 115, and a radar controller 120. The radar system 110 may be a MIMO radar system, for example. The vehicle 100 may include one or more other sensors 140 (e.g., cameras, lidar system) to obtain information about objects 150 or the vehicle 100 itself. The transmit portion 105 of the radar system 110 emits transmit signals 106 and the receive portion 115 of the radar system 110 receives reflected signals 116. The reflected signals 116 are portions of the transmit signals 106 that are reflected by objects 150 in the field of view of the radar system 110. The receive portion 115 is further detailed with reference to FIG. 2.

A controller 130 may obtain information from the radar system 110 as well as from one or more other sensors 140. The controller 130 may control semi-autonomous or autonomous operation of the vehicle 100 based on the information. The antenna selection detailed herein may be performed by the radar controller 120 alone or in combination with the controller 130. The radar controller 120 and the controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
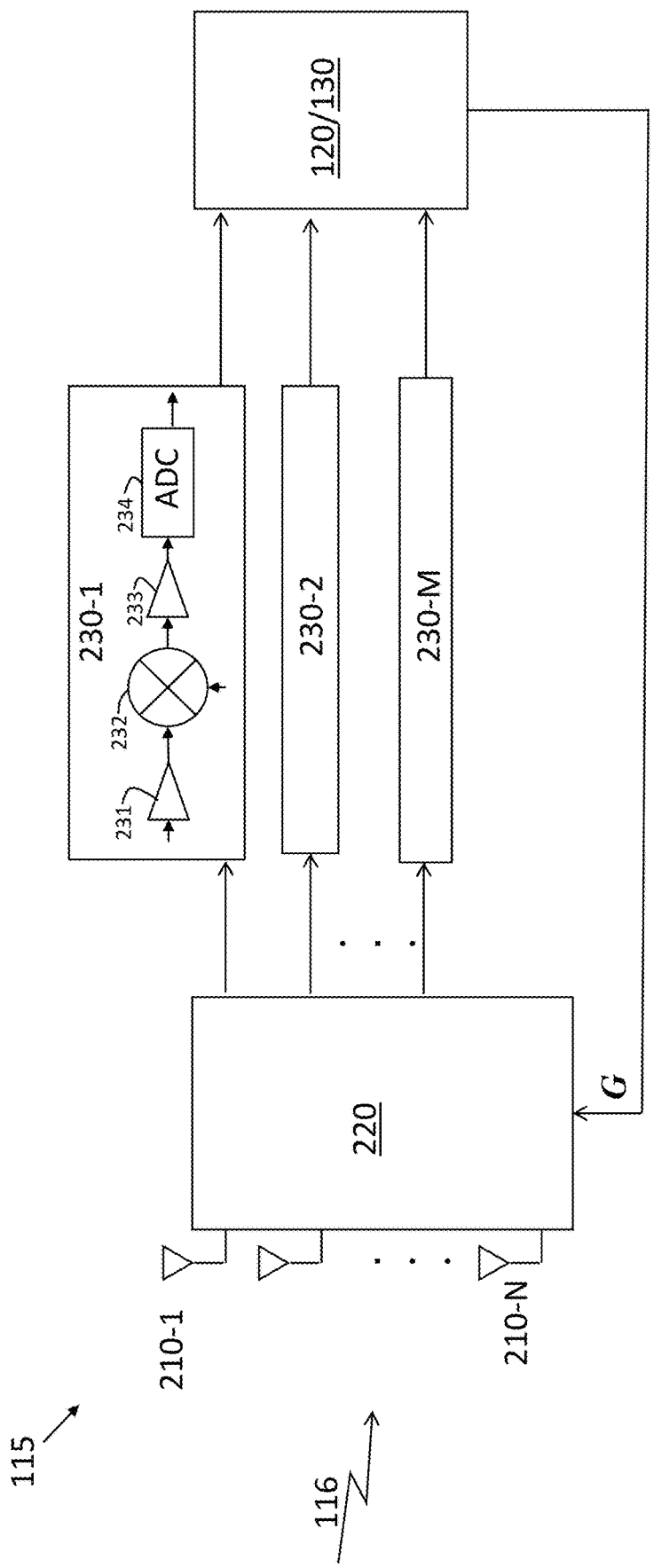
FIG. 2 is a block diagram of an exemplary receive portion of the radar system that performs antenna selection based on multiple detected objects and multi-step planning according to one or more embodiments.

FIG. 2 is a block diagram of an exemplary receive portion 115 of the radar system 110 that performs antenna selection based on multiple detected objects 150 and multi-step planning according to one or more embodiments. The receive portion 115 includes receive antenna elements 210-1 through 210-N (generally referred to as 210). The receive portion 115 also includes receive channels 230-1 through 230-M (generally referred to as 230). As shown for receive channel 230-1, each receive channel 230 generally includes an RF amplifier 231 that amplifies the received radio frequency (RF) signal (i.e., the portion of the received reflections 116 detected by the corresponding receive antenna element 210). A mixer 232 converts the received RF signal to an intermediate frequency (IF) signal that is amplified by an IF amplifier 233. An analog-to-digital converter (ADC) 234 provides a digitized signal to the controller (i.e., radar controller 120 and/or controller 130) for processing.

The number N of receive antenna elements 210 is greater than the number M of receive channels 230. Thus, an adaptive switch 220 couples some or all of the M receive channels 230 to a corresponding subset of the N receive antenna elements 210 at a given time. For explanatory purposes, M receive antenna elements 210 corresponding with the M receive channels 230, rather than fewer than M, are assumed to be selected at each transmit and receive iteration of the radar system 110. The selection of the receive antenna elements 210 to be operated is based on the adaptive switch 220, which may be implemented in the form of a switching matrix G, for example. The switching matrix G may be updated through processing by the radar controller 120 or controller 130, as further detailed with reference to FIG. 3. As previously noted, the switching matrix G is provided in consideration of any number of detected objects 150 and according to multi-step planning.

Figure 3:
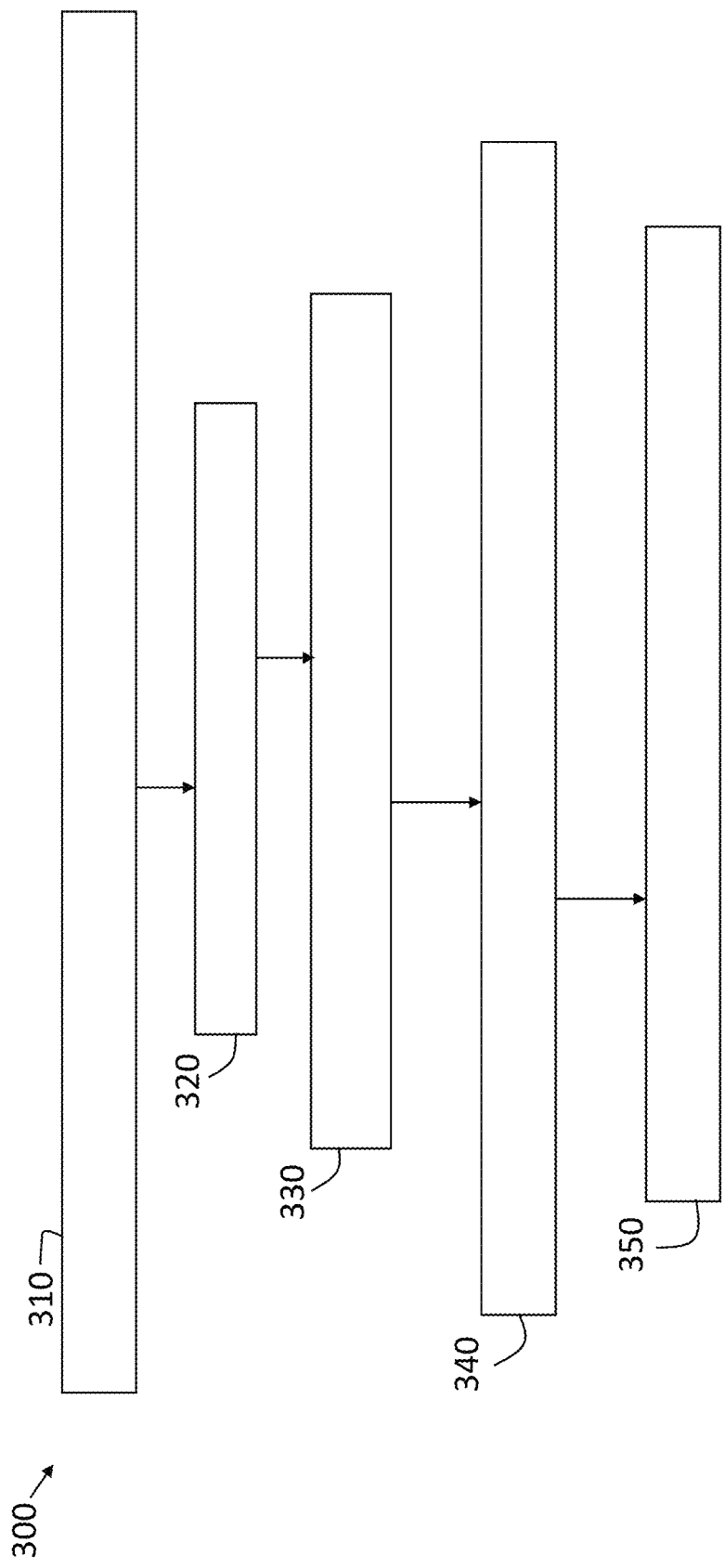
FIG. 3 is a process flow of a method of determining the switching matrix G for a given transmit and receive iteration of a radar system according to one or more embodiments.

FIG. 3 is a process flow of a method 300 of determining the switching matrix G for a given transmit and receive iteration of a radar system 110 according to one or more embodiments. At block 310, the processes include obtaining and sampling reflected signals 116 with receive antenna elements 210 selected according to a switching matrix $G_{k-1}$ set for a latest transmit and receive iteration K-1, where the iterations are k=1, . . . , K-1. At block 320, the DOA to each object 150 that is detected based on the reflected signals 116 received at iteration K-1 is estimated.

At block 330, a process is performed to generate a set of candidate switching matrices $\{G_K\}$ from which the switching matrix $G_K$ to be used in the next transmit and receive iteration K will be selected. At block 340, multi-step planning is undertaken with the set of candidate switching matrices $\{G_K\}$. For example, a decision tree is developed with each candidate in the set of candidate switching matrices $\{G_K\}$ acting as a root. At block 350, the root (i.e., candidate among the set of candidate switching matrices $\{G_K\}$) that is associated with the best sub-tree is selected as the switching matrix GK for the next transmit and receive iteration K. The best sub-tree refers to the one that results in the most accurate DOA estimate at the last level of the decision tree. Each of these processes is further detailed.

At block 310, the processes include obtaining and sampling reflected signals 116 at the $(K-1)^{th}$ iteration. Each receive antenna element 210 that is selected according to the switching matrix $G_{K-1}$ at the $(K-1)^{th}$ iteration obtains a portion of the reflected signals 116 (i.e., a received signal) and provides the received signal to the corresponding receive channel 230. The baseband model or vector of the received signals using M of the N receive antenna elements 210 and obtaining J samples is given by:

$$x_{jk} = G_k A(\varphi) S_{jk} + v_{jk} \quad \text{[EQ. 1]}$$

The index k refers to the transmit and receive iteration (e.g., (K-1)), and the index j refers to the samples 1 through J. In EQ. 1, A is an array of steering vectors $[\alpha(\varphi_1), \ldots, \alpha(\varphi_M)]$. Each steering vector corresponds with a direction of the received signal to the receive antenna element 210 that obtains that portion of the reflected signals 116. Steering vectors with higher power suggest an estimate for the DOA. A known multiple signal classification (MUSIC) algorithm, which is a frequency estimation method to distinguish closely spaced objects 150, uses the steering vectors in DOA estimation as detailed with reference to block 320.

The signal sequence $S_{jk}$ and the noise sequence $D_{jk}$ in EQ. 1 are mutually independent and have covariance matrices:

$$cov(S_{jk}) = R_s \quad \text{[EQ. 2]}$$

$$cov(v_{jk}) = \sigma_v^2 I_M \quad \text{[EQ. 3]}$$

The signal covariance matrix is $R_S$ in EQ. 2. In EQ. 3, the identity matrix $I_M$ is of size M, where M is the number of receive channels 230, and the square of noise, $\sigma_v^2$, is assumed to be known. The vectors $x_{jk}$ for the $k^{th}$ iteration (e.g., K-1 iteration) make up the observation matrix $X_k = [x_{1k} \ldots, x_{jk}]$. Thus, the current and past observation matrices $[X_1, \ldots, X_{K-1}]$ are available at block 310.

At block 320, estimating the angle $\varphi$ (e.g., DOA) to each detected object 150 involves an iterative process in which the object 150 associated with the current strongest signal is detected and then removed to facilitate detection of the object 150 associated with the next strongest signal. This is referred to as a CLEAN algorithm. As previously noted, DOA estimation also uses the MUSIC algorithm for classification of detections. Thus, MUSIC-CLEAN is used such that the MUSIC algorithm is used to estimate DOA for the object 150 associated with the strongest signal at each iteration according to the CLEAN algorithm.

At each iteration k the J samples are aggregated to construct the covariance matrix:

$$\hat{R}_{xk} \triangleq \frac{1}{J} \Sigma_{j=1}^J x_{jk} x_{jk}^H \quad \text{[EQ. 4]}$$

In EQ. 4, H indicates a Hermitian transpose. The DOA $\hat{\varphi}_1$ of the object 150 associated with the strongest signal is estimated as a mode of the cumulative $MUSIC_{1,k=1}, \ldots, K-1$ response. That is, the MUSIC algorithm is used cumulatively over K-1 iterations to estimate DOA $\hat{\varphi}_1$ of the object 150 with the strongest signal. In the exemplary case of only two objects 150, the DOA estimate of the weak object 150 is obtained by subtracting the contribution of the strong object 150 from the received signal spectrum, given by:

$$S = svd(\hat{R}_{xk}) \quad \text{[EQ. 5]}$$

The singular value decomposition (svd) in EQ. 5 results in a vector of singular values.

$$\hat{R}_{xk,\Delta} G_k \alpha(\hat{\varphi}_1) \alpha^H(\hat{\varphi}_1) G_k^H \quad \text{[EQ. 6]}$$

$$S_\Delta = svd(\hat{R}_{xk,\Delta}) \quad \text{[EQ. 7]}$$

$$\hat{R}_{xk,2} = \hat{R}_{xk} - \frac{S_{11}}{S_{\Delta 11}} \hat{R}_{xk,\Delta} \quad [\text{EQ. 8}]$$

The DOA $\hat{\varphi}_2$ of the object 150 associated with the weak signal is estimated as a mode of the cumulative MUSIC$_{2,k=1}$, . . . ,K-1 response. That is, the MUSIC algorithm is used cumulatively over K-1 iterations to estimate DOA $\hat{\varphi}_2$ of the object 150 with the weaker signal, which is the only other object 150 according to the exemplary case.

At block 330, the processes include generating a set of candidate switching matrices $\{G_k\}$. The full set of candidates would include every possible combination of M receive antenna elements 210 out of the full set of N receive antenna elements 210. However, instead of evaluating every combination of M out of the N receive antenna elements 210, a set of initial combinations is first evaluated, as detailed, to select the set of candidate switching matrices $\{G_K\}$ at block 330. For the candidate switching matrices $\{G_K\}$, a decision tree is generated (at block 340) to ultimately select the next M receive antenna elements 210 (at block 350) that will be defined by the switching matrix $G_K$.

At block 330, the initial combinations are generated by fixing the receive antenna element 210 corresponding with all but one of the M receive channels 230 (i.e., for M-1 receive channels 230). Then each of the (N-M-1) remaining receive antenna elements 210 is added to the fixed set, in turn, to generate each initial combination. According to an exemplary embodiment, the fixing may mean retaining (i.e., the receive antenna element 210 corresponding with M-1 receive channels 230 are retained from the previous iteration). According to an example for explanatory purposes, M=3 and N=5 such that there were three receive channels 230 and five receive antenna elements 210 A1, A2, A3, A4, and A5. Assuming that A3 and A5 are fixed as the receive antenna elements 210 for two of the receive channels 230, then each of A1, A2, and A4 is added to A3 and A5 to generate an initial combination. That is A1, A3, and A5 is one initial combination of receive antenna elements 210, A2, A3, A5 is a second initial combination of receive antenna elements 210, and A4, A3, and A5 is a third initial combination of receive antenna elements 210.

Continuing with the processes at block 330, after the initial combination of receive antenna elements 210 is generated, a set of candidate switching matrices $\{G_K\}$ representing a subset of the initial combination of receive antenna elements 210 is generated. The metric for evaluation of the initial candidates is a Bobrovski-Zakai bound (BZB). A Metropolis-Hastings (MH) algorithm is used to simulate objects 150 for detection. Specifically, the MH algorithm is used twice to generate single-target two-dimensional samples [$\varphi_i$, SNR$_i$], where i=1, 2 in the exemplary case of two objects 150. When i=1, the parameters of the strong object 150 and the covariance matrix of EQ. 9 (below) are used. When i=2, the parameters of the weak object 150 and the covariance matrix of EQ. 10 (below) are used.

For each n, where n is an index for the number of objects 150, the BZB on the DOA estimation error is evaluated. The BZB is combined with the CLEAN algorithm for a two-step BZB-CLEAN bound estimation for the exemplary case of two targets. At the first step, the BZB is derived for the strong object 150 (i.e., the object 150 that corresponds with the stronger signal) by subtracting the contribution of the weak object 150. Then, at the second step, the BZB is derived for the weak object 150 by subtracting the contribution of the strong object 150. At each step, the covariance matrix is obtained:

$$\hat{R}_{xn,1} = \hat{R}_{xn} - S\hat{N}R_2 G_n \alpha(\hat{\varphi}_2)\alpha^H(\hat{\varphi}_2) G_k^H \quad [\text{EQ. 9}]$$

$$\hat{R}_{xn,2} = \hat{R}_{xn} - S\hat{N}R_1 G_n \alpha(\hat{\varphi}_1)\alpha^H(\hat{\varphi}_1) G_k^H \quad [\text{EQ. 10}]$$

That is, the covariance matrices per EQS. 9 and 10 are used to obtain BZB1 and BZB2, respectively, for each initial combination of receive antenna elements 210. BZB1 and BZB2 are independently assessed such that only candidates with high scores for both BZB1 and BZB2 are of interest. A predefined number of the initial combination with the highest {BZB1, BZB2} may be retained or all of the initial combinations with {BZB1, BZB2} over a predefined threshold may be retained as the candidate switching matrices $\{G_K\}$.

The process at block 330 may be repeated by fixing the receive antenna element 210 corresponding with all but a different one of the M receive channels 230 for each iteration. Once the candidate switching matrices $\{G_K\}$ specifying a subset of the initial candidates of receive antenna elements 210 are obtained, a multi-step planning process is performed, at block 340. Each candidate switching matrix from the set of candidate switching matrices $\{G_k\}$ is at the root level of the decision tree. The sub-trees (i.e., additional levels) are grown through random switching. That is, random combinations of M receive antenna elements 210 are the next level of the decision tree. After a predefined depth of the decision tree is developed, the last level is evaluated based on aggregating error statistics and calculating root mean square error (RMSE), which is the average of the error per combination, for each sub-tree. The sub-tree with the minimum RMSE is traced back to its root to select one of the candidate switching matrices $\{G_K\}$ at block 350.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method comprising:
configuring an adaptive switch to couple a plurality of receive channels to a subset of a plurality of antenna elements as selected antenna elements;
receiving reflected signals with the selected antenna elements;
processing each of the reflected signals received at each of the selected antenna elements at a corresponding one of the plurality of receive channels to obtain a digital signal at each of the plurality of receive channels;
processing the digital signal from each of the plurality of receive channels to estimate a direction of arrival (DOA) to each object that is detected based on the reflected signals;
generating a set of candidate configurations of the adaptive switch to be assessed based on the DOA to each object from a set of initial configurations, wherein assessing the set of initial configurations of the adaptive switch to obtain the set of candidate configurations is based on the DOA to each object includes determining a Bobrovski-Zakai bound (BZB) to each object, and wherein assessing the set of candidate configurations of the adaptive switch includes performing a multi-step assessment using a decision tree with each of the set of candidate configurations as a root and examining accuracy of an output at a last step in the decision tree;

selecting a selected candidate configuration from the set of candidate configurations of the adaptive switch based on the accuracy obtained with each of the set of candidate configurations as the root of the decision tree; and configuring the adaptive switch according to the selected candidate configuration among the set of candidate configurations of the adaptive switch prior to receiving the reflected signals for a next iteration.

2. The method according to claim 1, wherein the processing each of the reflected signals includes amplifying, mixing, and performing analog-to-digital conversion on each of the reflected signals.

3. The method according to claim 1, wherein estimating the DOA to each object includes performing an iterative process to detect two or more objects.

4. The method according to claim 3, wherein the performing the iterative process includes detecting and removing an object among the two or more objects that results in a strongest reflection then removing the object prior to the next iteration.

5. The method according to claim 1, wherein the determining the BZB to each object is based on implementing a Metropolis-Hastings (MH) algorithm to simulate each object.

6. The method according to claim 1, further comprising fixing all but one of the plurality of receive channels coupled to all but one of the subset of the plurality of antenna elements to leave one unfixed receive channel and generating the set of initial configurations by coupling, in turn, the one unfixed receive channel to each of the plurality of antenna elements that is not coupled to all but one of the plurality of receive channels.

7. The method according to claim 1, wherein assessing the set of candidate configurations by performing the multi-step assessment using the decision tree includes using each candidate configuration of the set of candidate configurations as a root of the decision tree to grow sub-trees at each step of the multi-step assessment.

8. The method according to claim 7, wherein the using the decision tree includes growing each sub-tree based on random switching.

9. The method according to claim 7, wherein the selecting the selected candidate configuration is based on aggregating error statistics and calculating root mean square error (RMSE) at a last step of the multi-step assessment to select a corresponding root as the selected candidate configuration.

10. A radar system comprising:
a plurality of antenna elements;
a plurality of receive channels, each receive channel including an analog-to-digital converter (ADC) to output a digital signal;
an adaptive switch configured to couple the plurality of receive channels to a subset of the plurality of antenna elements as selected antenna elements, wherein the selected antenna elements are configured to receive reflected signals that result from reflection by a plurality of objects of transmitted signals emitted by the radar system and each of the plurality of receive channels is configured to output the digital signal based on the reflected signal from the selected antenna element coupled thereto; and a controller configured to process the digital signal from each of the plurality of receive channels to estimate a direction of arrival (DOA) to each object that is detected based on the reflected signals, generate a set of candidate configurations of the adaptive switch from a set of initial configurations to assess the set of candidate configurations of the adaptive switch based on the DOA to each object, wherein assessing the set of candidate configurations of the adaptive switch includes performing a multi-step assessment using a decision tree with each of the set of candidate configurations as a root and examining accuracy of an output at a last step in the decision tree, to select a selected candidate configuration from the set of candidate configurations of the adaptive switch based on the accuracy obtained with each of the set of candidate configurations as the root of the decision tree, and to configure the adaptive switch according to the selected candidate configuration among the set of candidate configurations of the adaptive switch prior to receiving the reflected signals for a next iteration.

11. The radar system according to claim 10, wherein each of the plurality of receive channels also includes an amplifier and a mixer.

12. The radar system according to claim 10, wherein the controller is configured to estimate the DOA to each object based on performing an iterative process to detect two or more objects.

13. The radar system according to claim 12, wherein the iterative process includes detecting and removing an object among the two or more objects that results in a strongest reflection then removing the object prior to the next iteration.

14. The radar system according to claim 10, wherein the controller is configured to assess the set of initial configurations of the adaptive switch to obtain the set of candidate configurations based on the DOA to each object by determining a Bobrovski-Zakai bound (BZB) to each object.

15. The radar system according to claim 14, wherein the controller is configured to determine the BZB to each object based on implementing a Metropolis-Hastings (MH) algorithm to simulate each object.

16. The radar system according to claim 14, wherein the controller is configured to fix all but one of the plurality of receive channels coupled to all but one of the subset of the plurality of antenna elements to leave one unfixed receive channel and to generate the set of initial configurations by coupling, in turn, the one unfixed receive channel to each of the plurality of antenna elements that is not coupled to all but one of the plurality of receive channels.

17. The radar system according to claim 10, wherein the controller is configured to assess the set of candidate configurations by performing the multi-step assessment using the decision tree by using each of the set of candidate configurations as a root of the decision tree to grow sub-trees at each step of the multi-step assessment.

18. The radar system according to claim 17, wherein the controller is configured to use the decision tree by growing each sub-tree based on random switching.

19. The radar system according to claim 17, wherein the controller is configured to select the selected candidate configuration based on aggregating error statistics and calculating root mean square error (RMSE) at a last step of the multi-step assessment to select a corresponding root as the selected candidate configuration.

20. A method comprising:
- configuring an adaptive switch to couple a plurality of receive channels to a subset of a plurality of antenna elements as selected antenna elements;
- receiving reflected signals with the selected antenna elements;
- processing each of the reflected signals received at each of the selected antenna elements at a corresponding one of the plurality of receive channels to obtain a digital signal at each of the plurality of receive channels;
- processing the digital signal from each of the plurality of receive channels to estimate a direction of arrival (DOA) to each object that is detected based on the reflected signals by performing an iterative process to detect two or more objects, wherein the performing the iterative process includes detecting and removing an object among the two or more objects that results in a strongest reflection then removing the object prior to the next iteration;
- generating a set of candidate configurations of the adaptive switch to be assessed based on the DOA to each object, wherein assessing the set of candidate configurations of the adaptive switch includes performing a multi-step assessment using a decision tree with each of the set of candidate configurations as a root and examining accuracy of an output at a last step in the decision tree;
- selecting a selected candidate configuration from the set of candidate configurations of the adaptive switch based on the accuracy obtained with each of the set of candidate configurations as the root of the decision tree; and
- configuring the adaptive switch according to the selected candidate configuration among the set of candidate configurations of the adaptive switch prior to receiving the reflected signals for a next iteration.

* * * * *